April 26, 1932.  G. E. WHIPPLE ET AL  1,855,658
BLEEDING MACHINE
Filed Nov. 18, 1929  3 Sheets-Sheet 1
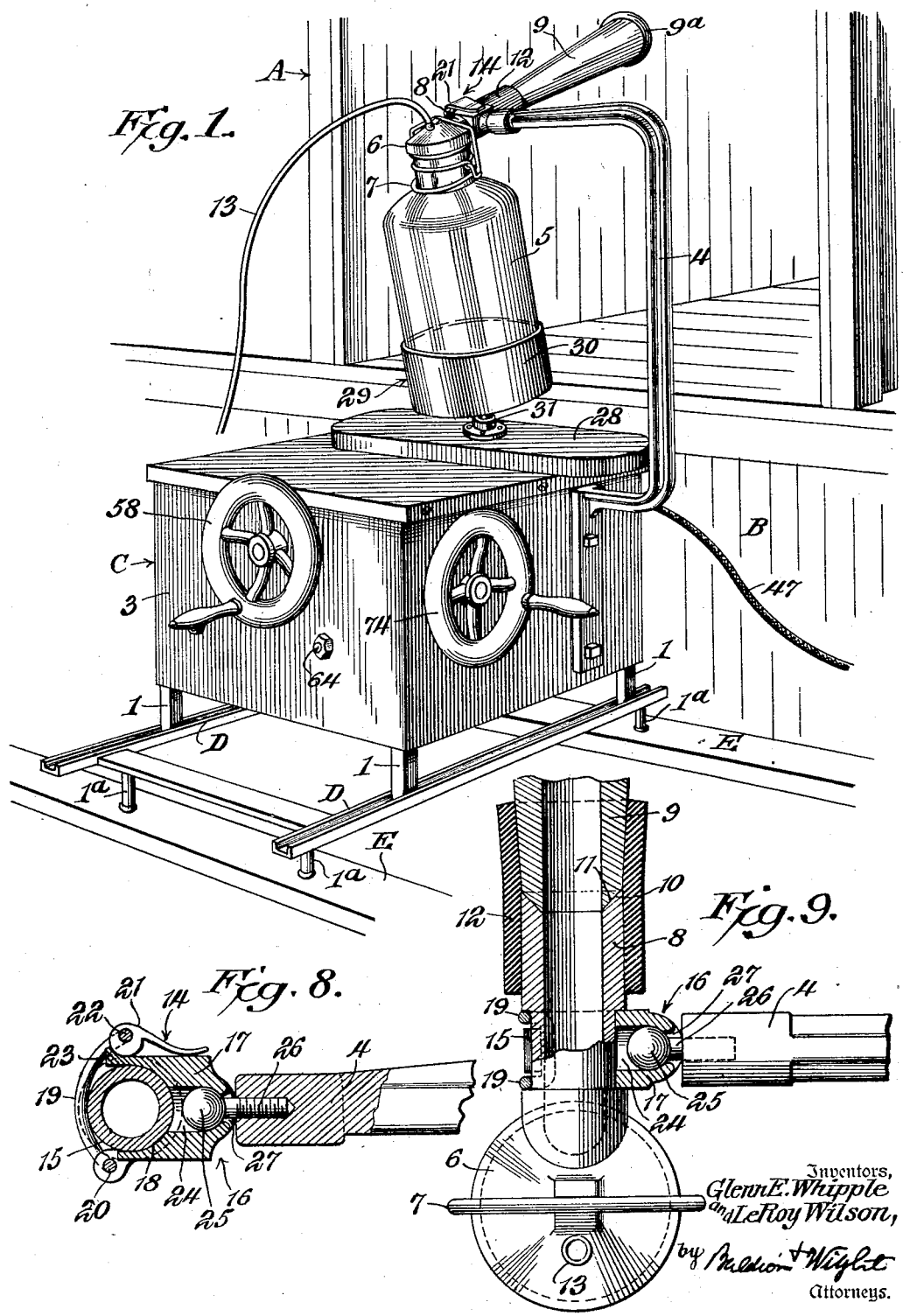
Inventors,
Glenn E. Whipple
and LeRoy Wilson,
Attorneys.

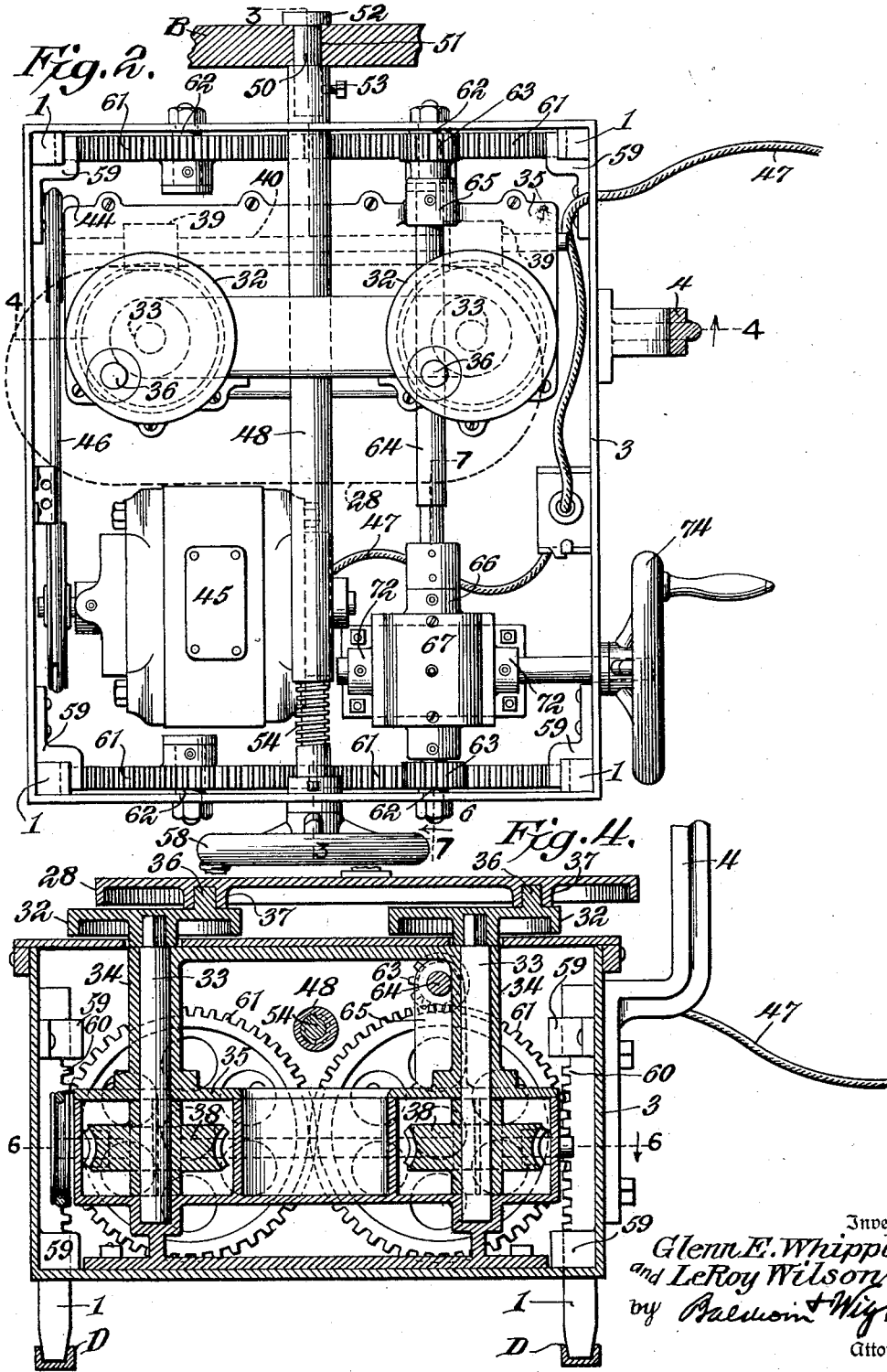

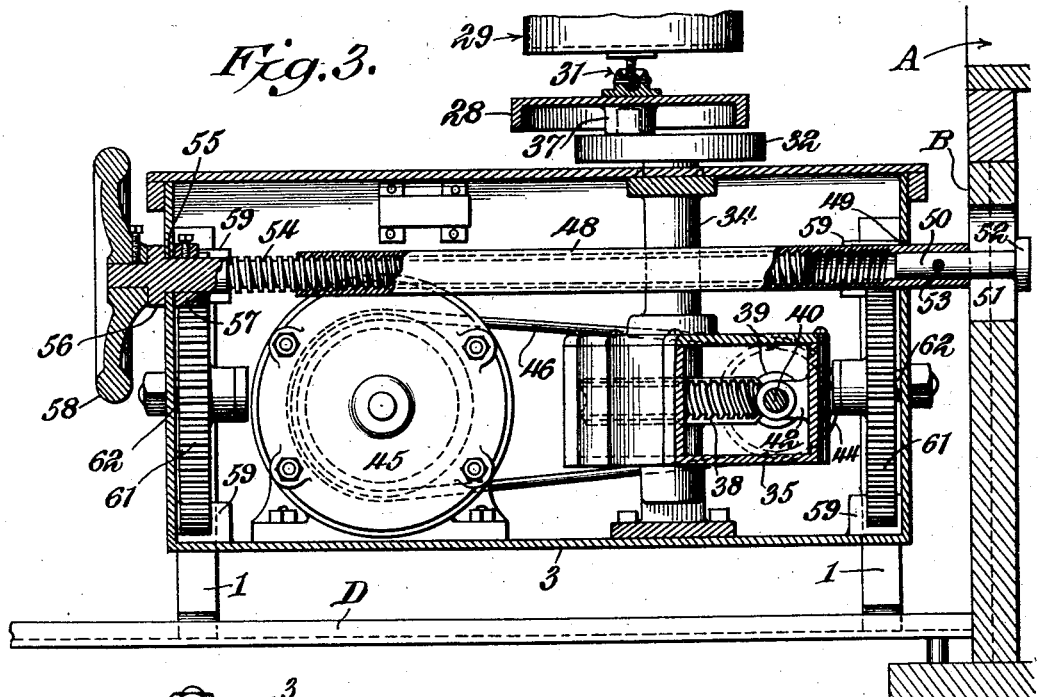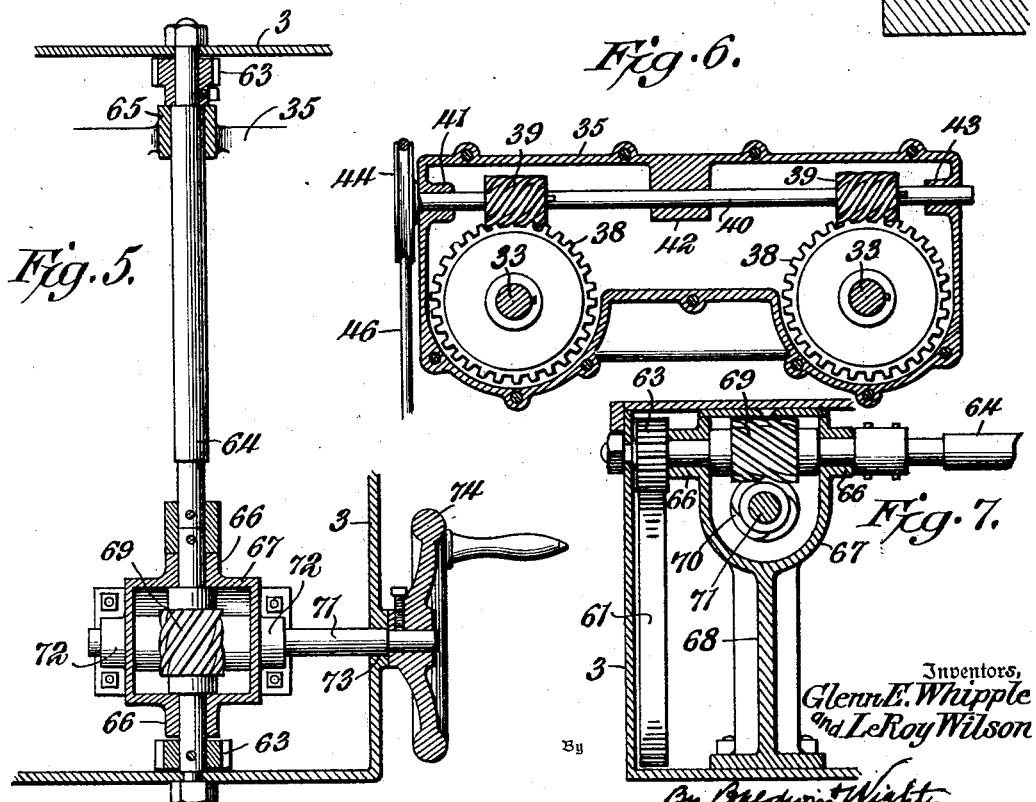

Patented Apr. 26, 1932

1,855,658

UNITED STATES PATENT OFFICE

GLENN E. WHIPPLE AND LE ROY WILSON, OF OMAHA, NEBRASKA, ASSIGNORS TO THE CORN STATES SERUM COMPANY, OF OMAHA, NEBRASKA

BLEEDING MACHINE

Application filed November 18, 1929. Serial No. 408,075.

Our invention relates to bleeding machines and more particularly to machines of this character which are used for extracting blood from hyper-immune hogs for producing anti-hog cholera serum.

In general, such machines include a receptacle, a tube carried by the receptacle and arranged to communicate therewith, the tube having a free end which is adapted to be placed over the tail of a hog which has previously been cut, and a hose communicating with the receptacle and connected to some means for producing a vacuum in the receptacle. It has been found that improved results are obtainable if the blood is agitated while it is being collected in the receptacle, this agitation serving to separate the fibrin from the blood before the blood has a chance to congeal, the congealing of the blood, if allowed to take place, tending to render fibrin separation at a subsequent time more difficult. Heretofore the receptacles of such machines have been given only a shaking or a translatory vibration. We have found that fibrin may be more efficiently separated from the blood by imparting a substantially rotary movement to the receptacle.

Accordingly the main object of our invention is to provide a bleeding machine including a receptacle and means for imparting a substantially circular bodily movement to the receptacle for agitating the blood while it is being collected therein to effect a more efficient removal or collection of the fibrin than has been possible with machines heretofore provided.

Another object of the invention is to provide means for effecting both vertical and horizontal adjustments of the machine towards and from the animal to be bled. Other objects will become apparent from a reading of the following description, the appended claims, and the several views illustrated in the drawings, in which:

Figure 1 is a perspective view of our improved bleeding machine;

Figure 2 is a top plan view of operating mechanism, the top of the casing containing the mechanism being removed;

Figure 3 is a vertical sectional view taken on the line 3—3 of Figure 2;

Figure 4 is a vertical sectional view taken on the line 4—4 of Figure 2;

Figure 5 is a horizontal sectional view of mechanism for effecting vertical adjustments of the machine;

Figure 6 is a horizontal sectional view taken on the line 6—6 of Figure 4;

Figure 7 is a vertical sectional view taken on the line 7—7 of Figure 2;

Figure 8 is a detail sectional view of a detachable tube clamp and a universal joint; and Figure 9 is a detail view, part in top plan and part in horizontal section of a receptacle cap, a universal joint, and a tube joint.

In the drawings there is shown a stall A for confining an animal to be bled, the stall being preferably disposed above the floor level and in the present instance is illustrated as being supported in part by a front wall B extending downwardly from the stall. The bleeding machine C is supported on a pair of spaced horizontal channel-shaped tracks D—D by means of legs 1. The tracks extend towards the wall B and are supported on a pair of spaced horizontal beams E—E by means of studs or pins 1a, the beams thus constituting a fixed base for the machine.

The machine C includes a frame F which comprises a casing or base 3 and a vertically extending bracket 4 secured to the casing. A receptacle 5 is closed at its upper end by a cap 6 detachably connected to the receptacle by means of a clamp 7 of well known construction, and the cap 6 is provided with a cap tube 8 which communicates with the interior of the receptacle and extends from the cap toward the stall A and in substantial parallelism with the tracks D—D. A tail-receiving tube 9 is disposed in alignment with the cap tube 8 and the tubes 8 and 9 are respectively formed with mating tapered ends 10 and 11 which are arranged in abutting relation. A tube 12 of rubber or other resilient material embraces the adjacent end portions of the tubes 8 and 9, and connects the tubes together, and at the same time provides for a limited amount of relative movement between the tubes. The end 9a of the tail tube is flared outwardly to facilitate the insertion of the tail of an animal to be bled. A hose 13 is connected at one of its ends to the cap 6 in a manner to communicate with the receptacle and at its other end is adapted to be connected to suitable means for producing a vacuum within the receptacle to promote the extraction of blood by the tail tube 9.

It is desirable that during the extraction of blood the tail-receiving tube be nearly stationary and that the lower end of the receptacle be given a rotary movement. To this end we provide means for connecting the cap 6 to the bracket 4 in a manner to maintain the cap against movements of translation, but to permit pivotal movements of the cap with respect to the bracket in all directions.

This means comprises a detachable clamp 14 adapted to embrace a reduced portion 15 of the cap tube and a universal joint 16 connecting the clamp to the bracket. The clamp comprises a block 17 formed with a recess 18 adapted to embrace the reduced portion 15 of the cap tube, and a pair of fingers 19 pivoted as at 20 to the block 17 and adapted to be maintained in engagement with the cap tube by means of a finger-operated cam 21 arranged to engage a projection 23 on the block. The block 17 is formed with a recess 24 in which is positioned a ball 25 at the end of a stem 26, this stem extending through an opening 27 in the block at the bottom of the recess 24 and being threaded into the bracket 4.

For imparting rotary bodily movements to the lower end of the receptacle, we have provided a horizontally disposed plate or support 28 which embraces the lower end of the receptacle, a universal joint 31 for connecting the plate 28 to the bottom of the cup 29, and means for bodily moving the plate or support 28 in a circular or other endless path.

The means for moving the plate 28 includes a pair of spaced horizontal discs 32—32 respectively fixed to vertical shafts 33—33 journalled in bearings 34 on a gear casing 35 which is secured to the bottom of the casing 3. Each disc 33 is provided with an upwardly extending pin 36 which fits in a recess in a boss 37 on the bottom of the plate 28. For rotating the shafts 33 and the discs 32 we provide the shafts with worm gears 38 respectively fixed to the lower ends of the shafts 33—33 and meshing respectively with worms 39—39 which are secured to a shaft 40, this shaft 40 being journalled in the gear casing 35 as at 41, 42, 43. Exteriorly of the gear casing the shaft 40 is provided with a pulley 44 which is adapted to be driven by an electric motor 45 through the medium of a belt 46. A lead 47 connected to the motor extends through an opening in the casing 3 and is adapted to be connected to any convenient source of power.

It will be observed that when the motor is running the discs 32—32 will rotate in unison so that the universal joint 31 on the plate 28 will move on a circular path and the receptacle will be thereby given the desired rotary bodily movements for agitating the blood and thereby efficiently separating the fibrin from the blood in the receptacle. During this movement of the receptacle the cap 6 does not move to any appreciable extent, the only movement of the cap being due to the very short distance between the vertical axis of the receptacle and the universal joint 16. This very slight movement of the cap will not tend to displace the tube 9 from the animal's tail because of the flexible connection between the cap tube and the tail tube. In other words, the top of the container is connected to a substantially stationary pivot, whereas the bottom of the container is bodily moved in a circular path relative to said pivot.

It is desirable that, after the animal to be bled has been secured in the stall, the tail-receiving tube be adjusted both vertically and horizontally so as to be brought into a position in which it can be conveniently and securely attached to the animal's tail. For effecting horizontal adjustment of the tube, we provide means for sliding the entire machine longitudinally of the tracks D, that is, towards or from the animal. This means comprises an internally threaded hollow rod or sleeve 48 extending through an opening 49 in the casing and having at its outer end a pin 50 which passes through a vertical slot 51 in the wall B and is provided with a head 52 wider than said slot. A set screw 53 threaded into the rod 48 secures the rod to the pin. An externally threaded rod 54 extends through and is journalled in an opening 55 in the casing and is threadably engaged with the internally threaded rod 48. A flange 56 on the rod 54 and exteriorly of the casing, and a collar 57 secured to the rod inside of the casing serve to maintain the rod against longitudinal movements with respect to the casing. A hand wheel 58 is secured to the outer end of the rod to provide for manually rotating the latter. It will be observed that when the hand wheel is rotated the rod 54 cannot be moved longitudinally of the casing, but, by virtue of the threaded engagement of the rod with the fixed hollow rod 48, the rod 54 and the casing 3 will be moved bodily towards or away from the wall B and the stall A, depending upon the direction of rotation of the hand wheel. In this way the tube 9 may be moved horizontally towards or away from the point of application.

For effecting vertical adjustments of the tube 9 towards and away from the point of application, we provide means for moving the casing, the receptacle, and the tube bodily and vertically with respect to the fixed base E and tracks D. The legs 1 are mounted for vertical movements relative to the casing in guides preferably formed conjointly by the corners of the casing and guide brackets 59 secured to the casing. Each leg 1 is formed with a toothed rack 60, these racks being arranged to mesh respectively with gears 61 journalled on stub shafts 62 secured to the casing. The gears 61 are arranged in pairs the gears of each pair meshing one with the other as shown in Figures 2 and 4.

For rotating the gears 61 there are provided two pinions 63—63 which respectively mesh with the gears 60 at the right hand side of the casing as viewed in Figure 2. The pinions 63 are secured to opposite ends of a shaft 64 which is journalled in a bearing 65 on the gear casing 35 and in bearings 66 in another gear casing 67 which is supported on the bottom of the main casing 3 by means of a bracket 68.

The shaft 64 is provided with a helical gear 69 which meshes with a companion gear 70 which is secured to a shaft 71 disposed at right angles to the shaft 64 and journalled in bearings 72 in the casing 67, and as at 73 in the casing 3. Exteriorly of the casing 3 the shaft 71 is provided with a hand wheel 74 which facilitates rotation of the shaft 71.

When the shaft 71 is rotated by means of the hand wheel, the shaft 64 will also be rotated and the pinion 63 on this shaft 64 will rotate the two gears 61 at the right hand side of the casing, as viewed in Figure 2. These gears 61 at the right hand side of the casing will in turn rotate the gears 61 at the left hand side of the casing with which they mesh. The four gears 61 while rotating will move the casing either upwardly or downwardly with respect to the legs, depending upon the direction of rotation of the hand wheel so that, by rotating the hand wheel in the proper direction, the casing 3, the receptacle, and the tail tube 9 will be adjusted vertically to a position in which the tube may be readily applied to the tail of the animal to be bled. It will be observed that the frame F and parts carried thereby constitute a self contained apparatus which is both vertically and horizontally adjustable as a unit.

A machine embodying our invention and provided with means for giving the receptacle a bodily rotary movement provides for more efficient separation of the fibrin from the blood than has heretofore been the case, thus greatly improving the qualities of the serum to be manufactured. The herein described machine also possesses the additional advantage of being very convenient in operation in that, after the animal has been secured in the stall, the tail-receiving tube may be readily moved to a position in which it may be applied to the animal's tail.

We claim:

1. In a bleeding apparatus, the combination with a frame of a receptacle adapted to receive blood extracted from an animal, means communicating with said receptacle and adapted to be connected to means for evacuating the receptacle, a connection between said frame and one end of said receptacle, said connection permitting universal movement between said end of the receptacle and the frame but maintaining said end against movement of translation with respect to the frame, and means movable in an endless path with respect to the frame and connected to the other end of the receptacle for moving said other end in an endless path.

2. In a bleeding apparatus, the combination with a frame, of a receptacle adapted to receive blood extracted from an animal, a universal joint connecting one end of the receptacle to said frame, and means movable in an endless path with respect to the frame and connected to the other end of said receptacle for moving said other end in an endless path.

3. In a bleeding apparatus, the combination with a frame, of a substantially vertical receptacle adapted to receive blood extracted from an animal, a universal joint connecting the upper end of the receptacle to said frame, and means movable in an endless path with respect to the frame and connected to the lower end of said receptacle for moving said lower end in an endless path.

4. In a bleeding apparatus, the combination with a frame, of a substantially vertical receptacle adapted to receive blood extracted from an animal, a ball and socket joint connecting the upper end of the receptacle to said frame, and means movable in an endless path with respect to the frame and connected to the lower end of said receptacle for moving said lower end in an endless path.

5. In a bleeding apparatus, the combination with a frame, of a substantially vertical receptacle adapted to receive blood extracted from an animal, a universal joint connecting the upper end of said receptacle to said frame, means movable in an endless path with respect to the frame, and a universal joint interposed between and connecting said movable means to the lower end of said receptacle.

6. In a bleeding apparatus, the combination with a frame, of a substantially vertical receptacle adapted to receive blood extracted from an animal, means for detachably connecting the upper end of said receptacle to said frame and including a universal joint, a holder having a bottom and an upwardly extending flange portion embracing a portion of the bottom of said receptacle, means disposed below said holder and adapted to be moved in a circular path, and a universal joint between said moving means and the bottom of said holder.

7. In a bleeding apparatus, the combination with a frame including a base and an upwardly extending bracket secured to the base, of a substantially vertical receptacle having an open upper end, a cap on the upper end of the receptacle and having a tube communicating with said receptacle and adapted to pass blood extracted from an animal to said receptacle, clamp means adapted to releasably embrace a portion of said tube, means connecting said clamp means to said bracket for movements relative thereto, and means movable with respect to said base and bracket and connected to the lower end of said receptacle for moving the latter.

8. In a bleeding apparatus, the combination with a frame of a substantially vertical receptacle having an open upper end, a tail-receiving tube adapted to be attached to the tail of an animal to be bled and arranged to communicate with the receptacle at its upper end, a flexible connection between said tube and the receptacle, means connecting the upper end of the receptacle to said frame for movements relative thereto, means movable with respect to the base and in a horizontal plane, and a universal joint connecting said means to the bottom end of the receptacle.

9. In a bleeding apparatus, the combination with a frame, of a substantially vertical receptacle having an open upper end, a cap on the upper end of the receptacle and having a relatively rigid cap tube communicating with said receptacle and adapted to pass blood extracted from an animal to said receptacle, a universal joint connecting said tube to said frame, a relatively rigid tail-receiving tube adapted to be applied to the tail of an animal for extracting blood therefrom, said tubes being in substantial alignment and having their adjacent ends in substantial abutting relation, a relatively flexible tube embracing the adjacent end portions of said cap and said tail-receiving tubes, and means movable with respect to said frame and in a substantially horizontal plane and adapted to be connected to the lower end of said receptacle for moving the latter.

10. In a bleeding apparatus, the combination with a frame, of a substantially vertical receptacle adapted to receive blood extracted from an animal, a universal joint connecting the upper end of the receptacle to said frame, a pair of horizontal discs arranged in a common plane underneath said receptacle and journalled for rotary movements relative to the frame, each of said discs being provided with an eccentric upwardly extending pin, a horizontal plate pivotally connected to the pins on said discs and disposed under said receptacle, a universal joint connection between said plate and the lower end of the receptacle, and means for rotating said discs in unison.

In testimony whereof, we have hereunto subscribed our names.

GLENN E. WHIPPLE.
LE ROY WILSON.